United States Patent
Ganesan et al.

(10) Patent No.: US 11,347,435 B2
(45) Date of Patent: May 31, 2022

(54) ONE-TOUCH MIGRATION OF VIRTUAL ASSETS

(71) Applicant: Dell Products, L.P., Round Rock, TX (US)

(72) Inventors: Vaideeswaran Ganesan, Bangalore (IN); Deepaganesh Paulraj, Bangalrore (IN); Ankit Singh, Bangalore (IN); Vinod P S, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 13 days.

(21) Appl. No.: 16/932,484

(22) Filed: Jul. 17, 2020

(65) Prior Publication Data

US 2022/0019378 A1    Jan. 20, 2022

(51) Int. Cl.
*G06F 3/06* (2006.01)
*G06F 9/455* (2018.01)

(52) U.S. Cl.
CPC .......... *G06F 3/0659* (2013.01); *G06F 3/0604* (2013.01); *G06F 3/067* (2013.01); *G06F 3/0664* (2013.01); *G06F 9/45558* (2013.01); *G06F 2009/4557* (2013.01); *G06F 2009/45583* (2013.01); *G06F 2009/45595* (2013.01)

(58) Field of Classification Search
CPC .... G06F 3/0604; G06F 3/0659; G06F 3/0664; G06F 3/067; G06F 9/45558; G06F 2009/4557; G06F 2009/45583; G06F 2009/45595
See application file for complete search history.

(56) References Cited

U.S. PATENT DOCUMENTS

| | | | | |
|---|---|---|---|---|
| 2011/0231839 A1* | 9/2011 | Bennett | .................. | G06F 3/0604 718/1 |
| 2012/0059934 A1* | 3/2012 | Rafiq | .................. | H04L 67/1002 709/225 |
| 2014/0108665 A1* | 4/2014 | Arora | .................. | H04L 65/1069 709/227 |
| 2014/0207920 A1* | 7/2014 | Hirana | ................ | H04L 41/0803 709/220 |
| 2017/0315739 A1* | 11/2017 | Ratra | .................... | G06F 3/0689 |
| 2018/0113728 A1* | 4/2018 | Musani | ..................... | G06F 8/65 |
| 2018/0173290 A1* | 6/2018 | Nakajima | ............. | G06F 1/3293 |
| 2019/0034215 A1* | 1/2019 | Ganesan | .......... | G06F 15/17331 |

(Continued)

*Primary Examiner* — Eric T Oberly
(74) *Attorney, Agent, or Firm* — Fogarty LLP

(57) ABSTRACT

Systems and methods for providing one-touch migration of virtual assets are described. In some embodiments, an Information Handling System (IHS), may include a processor, a remote access controller (RAC) coupled to the processor, and a memory coupled to the RAC, the RAC configured to: assume a role of an originating group's manager, where the originating group comprises a first plurality of IHSs and each IHS has one or more virtual assets of a first type; collect configuration information related to other IHSs; transmit the configuration information to another RAC of another IHS designated as a destination group's manager, comprising a second plurality of IHSs, where the other RAC is configured to: perform a compatibility check using the configuration information; and validate a migration of the one or more virtual assets from the first plurality of IHSs to the second plurality of IHSs, where migrated assets are of a second type.

8 Claims, 5 Drawing Sheets

(56) References Cited

U.S. PATENT DOCUMENTS

| | | | |
|---|---|---|---|
| 2019/0041967 A1* | 2/2019 | Ananthakrishnan | ............................ G06F 1/3243 |
| 2019/0129855 A1* | 5/2019 | Kelly | .................. G06F 12/0868 |
| 2020/0012505 A1* | 1/2020 | Shil | ..................... H04L 12/4641 |
| 2021/0263899 A1* | 8/2021 | Marappagounder | ........................ G06Q 10/06315 |

\* cited by examiner

ONE-TOUCH MIGRATION OF VIRTUAL ASSETS

FIELD

This disclosure relates generally to Information Handling Systems (IHSs), and more specifically, to systems and methods for providing one-touch migration of virtual assets.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A "converged" or "hyper-converged" infrastructure is a software-defined IHS infrastructure that virtualizes the elements of conventional "hardware-defined" systems. A software-defined infrastructure may include, for example, virtualized computing, virtual machines, software-defined storage, and/or virtualized networking running on commercial off-the-shelf servers. Because the software-defined elements are implemented within the context of a hypervisor, management of resources can be shared across all instances of a hyper-converged infrastructure.

As the inventors hereof have recognized, different IHS vendors provide different types of hyper-converged infrastructure architectures, and each vendor offers migration tools for converting or transforming one particular type of virtual asset cluster into another type (e.g., from a Virtual Hard Disk (VHD) format to an Open Virtualization Format (OVF) format and vice-versa, from virtual storage area network (vSAN) to storage spaces direct (S2D), etc.). However, these are complicated solutions that can be prohibitively expensive. To address these, and other problems, the inventors hereof have developed systems and methods for providing one-touch migration of virtual assets.

SUMMARY

Embodiments of systems and methods for providing one-touch migration of virtual assets are described. In an illustrative, non-limiting embodiment, an Information Handling System (IHS) may include: a processor; a remote access controller (RAC) coupled to the processor; and a memory coupled to the RAC, the memory having program instructions stored thereon that, upon execution, cause the RAC to: assume a role of an originating group's manager, wherein the originating group comprises a first plurality of IHSs, and wherein each IHS of the first plurality of IHSs has one or more virtual assets of a first type; collect configuration information related to other IHSs in the first plurality of IHSs; transmit the configuration information to another RAC of another IHS, wherein the other RAC is designated as a destination group's manager, wherein the destination group comprises a second plurality of IHSs, and wherein the other RAC is configured to: perform at least one compatibility check using the configuration information; and in response to the compatibility check being successful, validate a migration of the one or more virtual assets from the first plurality of IHSs to the second plurality of IHSs, wherein migrated virtual assets are of a second type different from the first type.

The virtual assets may include virtual machines (VMs), and the first and second types may be selected from the group consisting of: Virtual Hard Disk (VHD) format, and Open Virtualization Format (OVF) format. Additionally, or alternatively, the virtual assets may include virtual storage, and the first and second types may be selected from the group consisting of: virtual storage area network (vSAN), and storage spaces direct (S2D). The configuration information may include at least one of: network switch information, storage information, and IHS hardware information.

In some implementations, the migration may be performed via a backup and recovery server configured to translate data from the first type to the second type. Moreover, the transmission of the configuration information may be performed via a RAC-to-RAC network. To perform the compatibly check, the other RAC may be configured to normalize a priority of a virtual machine (VM). Additionally, or alternatively, to perform the compatibly check, the other RAC may be configured to translate a command from a first format of the first type to a second format of the second type.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
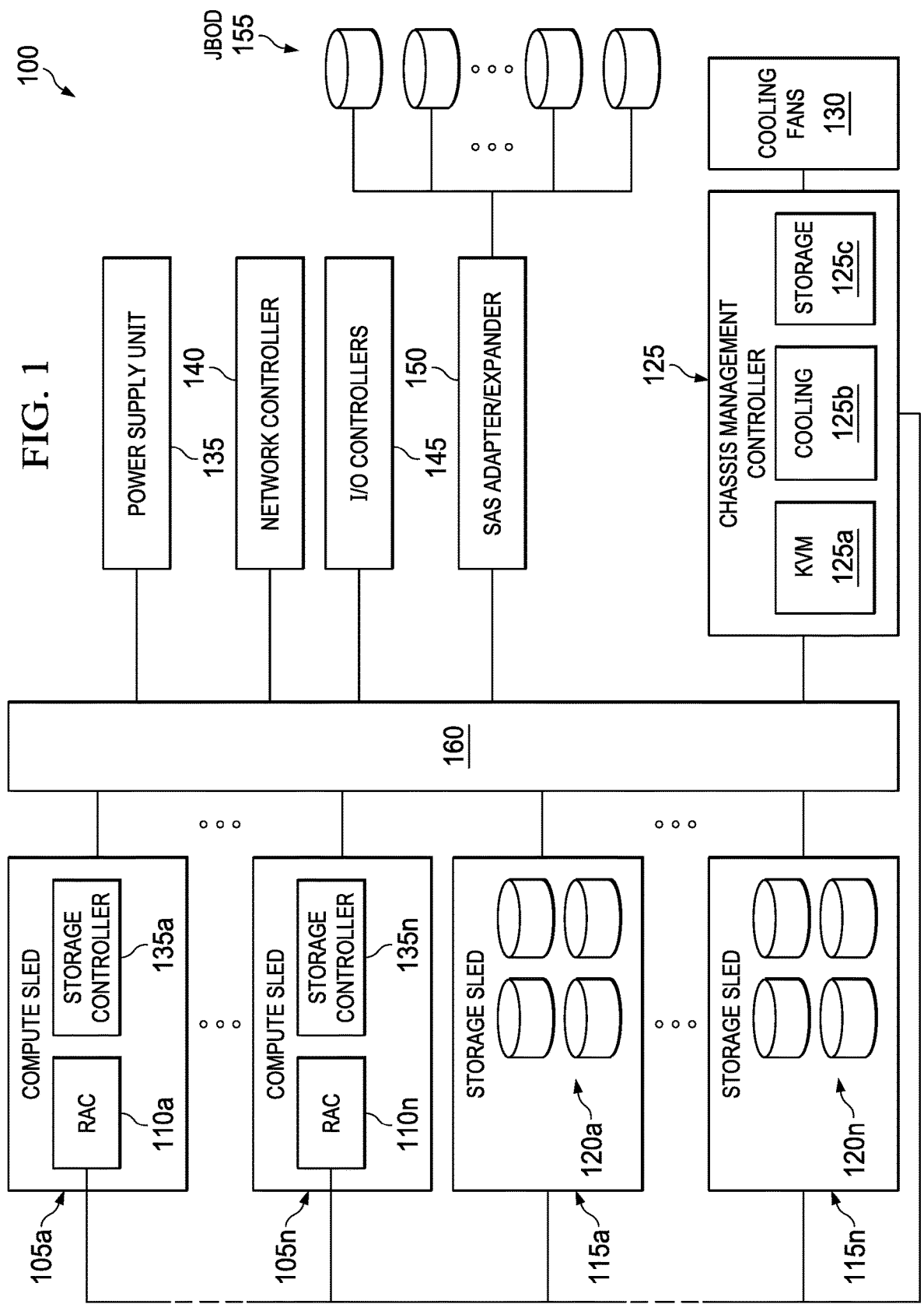
FIG. 1 is a block diagram of examples of components of a chassis configured to provide one-touch migration of virtual assets, according to some embodiments.

Embodiments of systems and methods for providing one-touch migration of virtual assets are described. As used herein, the term virtual machine (VM) generally refers to a program executed by an IHS that works as if it were a virtual, separate Information Handling System (IHS) inside of a main IHS. The program that creates and manages these VMs is a virtualization software called a hypervisor, and the IHS that runs the VM is called the host. The hypervisor controls how the VM can access memory, hard drive, and other resources on the host IHS.

In context of VMs, a "snapshot" is an entity that preserves the state and data of a VM at a specific point in time, and it may include the VM's power state (e.g., powered-on, powered-off, suspended), as well as all of the files that make up the VM (e.g., disks, memory, and other devices, such as virtual network interface cards). In certain VMs, the virtual disk may be a file (e.g., with a ".vmdk" extension) residing on a data store (LUN). When a snapshot is created, the original disk becomes read-only and all new data changes are written into a temporary delta disk pointing to the original one. The delta disk contains the differences between the state at the moment when the snapshot was taken and the current state of the virtual disk. The process of taking a VM snapshot may also involve the creation of snapshots and metadata information (e.g., with a ".vmsd" extension), running state information (e.g., with a ".vmsn" extension), etc.

In some embodiments, systems and methods described herein may be used to migrate a first technology cluster into a second technology cluster with a single click or command. Particularly, an "originating group manager" (OGM) may contain all the hosts participating in a given cluster. All virtual assets may be discovered by a "target" or "destination group manager" (DGM). All remote access controllers (RACs) of participating hosts in originating environment will be part of the OGM. The OGM may collect the hardware, firmware, and configuration details of every host machine through their respective RACs.

OGM also collects all configuration details from the operating system (OS)/cluster environment, including network switch details, storage/disk configuration details, VM details (e.g., CPU, memory, network switch connectivity, disk details, etc.), virtual switch details, etc. All details of all hosts within the cluster are collected. The entire set is packaged into a single unit and transferred to the DGM.

The DGM scans the package and looks for compatibility checks. In the compatibility check, it looks for what aspects can be transferred and how. For example: (a) if a VM's priority in Hyper-V is in range of 0-100 but VMWare does not have any range, while VM priority is transferred to VMWare the VM's priority in VMWare may be normalized to 0-100; (b) vSwitch information may be mapped between VMWare to Hyper-V or vice versa. In case some properties of a technology do not exist (for example, some Network Virtualization and Security NSX plattform capabilities are not present in Hyper-V), then the migration may be rejected; and (c) commands needed to change VMs (if they are in a different format) may be validated. Type-1 VMs of Hyper-V do not have an equivalent in VMWare, so they may be discarded.

Once validation is complete, if migration is possible, the validation module initiates the migration. If not, the process aborts. If migration is possible, then all the network assets (e.g., vSwitch, etc.) are recreated from scratch onto the target systems. After that, all other assets (e.g., disks, VMs, VM Templates) may be reformatted to the new environment and are brought alive on the new environment.

In another embodiment, systems and methods described herein may be used to migrate vSAN to S2D (or vice-versa), including configuration information, VMs, and other data to rebuild a similar software defined-storage infrastructure with a single click or command. All RACs of participating host IHSs in the originating environment (vSAN/S2D) may be part of an OGM.

The OGM may collect the hardware, firmware, and configuration details of every host machine through their respective RAC. The OGM communicates with a backup client (e.g., DELL's AVAMAR) installed on participating hosts through representational state transfer (REST) application programming interfaces (APIs) to schedule backup/restore operations. The backup client backs up the data in backup server based on the backup configuration done by the OGM.

The backup server maps and/or converts the data and configuration to match destination environment (vSAN or S2D or any future technology not yet developed). When migration is initiated, the data backed up in the backup server, user/device configuration changes may be pushed to the backup clients in the destination group. The backup clients along with the DGM save the data in the relevant storage locations and configure devices to match the destination environment. The DGM coordinates the migration by communicating with the backup clients through REST APIs to restore the data collected from the original environment.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 1 is a block diagram illustrating certain components of chassis 100 comprising one or more compute sleds 105a-n and one or more storage sleds 115a-n that may be configured to implement systems and methods for providing one-touch migration of virtual assets. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays.

Other embodiments may include additional types of sleds that provide various types of storage and/or processing capabilities. Other types of sleds may provide power management and networking functions. Sleds may be individually installed and removed from the chassis 100, thus allowing the computing and storage capabilities of chassis 100 to be reconfigured by swapping the sleds with different types of sleds, in many cases without affecting the operations of the other installed sleds.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and the storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. Chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

Sleds 105a-n, 115a-n may be individually coupled to chassis 100 via connectors that correspond to the bays provided by the chassis 100 and that physically and electrically couple an individual sled to backplane 160. Chassis backplane 160 may be a printed circuit board that includes electrical traces and connectors that are configured to route signals between the various components of chassis 100 that are connected to backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
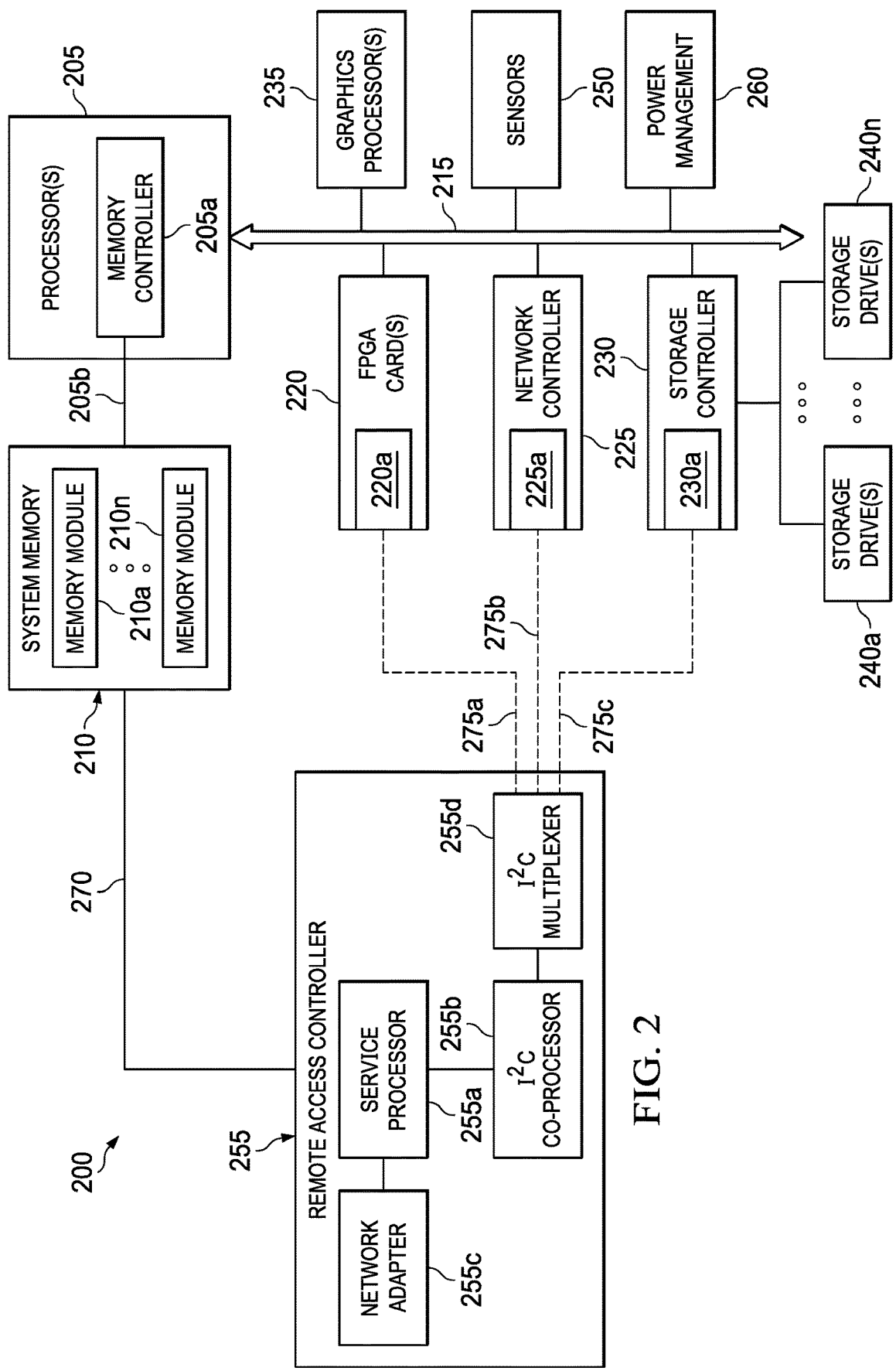
FIG. 2 is a block diagram of examples of components of an Information Handling System (IHS) configured to provide one-touch migration of virtual assets, according to some embodiments.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

Each compute sled 105a-n includes a remote access controller (RAC) 110a-n. Remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controller 110a-n may collect sensor data, such as temperature sensor readings, from components of the chassis 100 in support of airflow cooling of the chassis 100 and the sleds 105a-n, 115a-n. In addition, each remote access controller 110a-n may implement various monitoring and administrative functions related to compute sleds 105a-n that require sideband bus connections with various internal components of the respective compute sleds 105a-n.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located.

As illustrated, chassis 100 of FIG. 1 further includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

In the illustrated embodiment, the chassis management controller 125 includes a storage module 125c that provides capabilities for managing and configuring certain aspects of the storage devices of chassis 100, such as the storage devices provided within storage sleds 115a-n and within the JBOD 155. Each of the storage controllers 135a-n may be used to implement various types of virtual storage configurations, such as RAID configurations, using the storage devices provided by the chassis 100. Accordingly, chassis 100 may support large numbers of combinations of different storage devices that may be configured in various types virtual storage profiles, thus resulting in significant difficulty for administrators to track the storage devices that are currently available for setting up a new storage configuration, or for replacing a failed storage device within an existing storage configuration.

Storage module 125c of the chassis management controller 125 may support requests for storage configurations by each of the storage controllers 135a-n by selecting and mapping storage devices from those available within the chassis 100, and in certain embodiments, from those available in any other similarly configured chassis that can be accessed by the chassis management controller 125.

Storage module 125c may also be further configured to manage all of the unmapped storage devices of chassis 100 as a global pool of spare storage devices that may be used to support the storage configurations operated by each of the storage controllers 135a-n. In this manner, the capabilities of the chassis management controller 125 may provide administrators with the ability to set up virtual storage configurations using all shared storage resources that are available within a chassis 100, or within other accessible chassis.

FIG. 2 shows an example of an IHS 200 configured to implement systems and methods for providing one-touch migration of virtual assets. For example, IHS 200 may be implemented as any desktop, laptop, or tablet computing device in the form of a client device or IHS. In some cases, IHS 200 may also be a compute sled or server, such as compute sleds 105a-n of FIG. 1, that may be installed within chassis 100 and which may in turn be installed within a rack. Installed in this manner, IHS 200 may utilize shared power, network and cooling resources provided by the chassis and/or rack.

IHS 200 may utilize one or more processor(s) 205. In some embodiments, processor(s) 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 include an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

System memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, system memory 210 may include multiple removable memory modules. The system memory 210 of the illustrated implementation includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other implementations of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more sensors 250.

In various implementations, sensors 250 may include, but are not limited to: electric, magnetic, hall effect, radio, optical, infrared, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed). One or more of sensors 250 may be disposed within IHS 200, on a bezel of IHS 200, on a display, on a hinge coupling a display portion to a keyboard portion of IHS 200, or on a keyboard or other input device.

Processor(s) 205 may be configured to provide one-touch migration of virtual assets using contextual information obtained from sensors 250.

For instance, during operation of IHS 200, the user may open, close, flip, swivel, or rotate a display to produce different IHS postures. In some cases, processor(s) 205 may be configured to determine a current posture of IHS 200 using sensors 250. For example, in a dual-display IHS implementation, when a first display (in a first IHS portion) is folded against a second display (in a second IHS portion) so that the two displays have their backs against each other, IHS 200 may be said to have assumed a book posture. Other postures may include a table posture, a display posture, a laptop posture, a stand posture, or a tent posture, depending upon whether IHS 200 is stationary, moving, horizontal, resting at a different angle, and/or its orientation (landscape vs. portrait).

For example, in a laptop posture, a first display surface of a first display may be facing the user at an obtuse angle with respect to a second display surface of a second display or a physical keyboard portion. In a tablet posture, a first display may be at a straight angle with respect to a second display or a physical keyboard portion. And, in a book posture, a first display may have its back resting against the back of a second display or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

In other cases, processor(s) 205 may process user presence data received by sensors 250 and may determine, for example, whether an IHS's end-user is present or absent. Moreover, in situations where the end-user is present before IHS 200, processor(s) 205 may further determine a distance of the end-user from IHS 200 continuously or at predetermined time intervals. The detected or calculated distances may be used by processor(s) 205 to classify the user as being in the IHS's near-field (user's position<threshold distance A), mid-field (threshold distance A<user's position<threshold distance B, where B>A), or far-field (user's position>threshold distance C, where C>B) with respect to IHS 200.

More generally, in various implementations, processor(s) 205 may receive and/or to produce system context information using sensors 250 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 200, a physical keyboard external to IHS 200, or an on-screen keyboard), whether the user operating the keyboard is typing with one or two hands (e.g., holding a stylus, or the like), a time of day, software application(s) under execution in focus for receiving keyboard input, whether IHS 200 is inside or outside of a carrying bag, ambient lighting, a battery charge level, whether IHS 200 is operating from battery power or is plugged into an AC power source (e.g., whether the IHS is operating in AC-only mode, DC-only mode, or AC+DC mode), a power consumption of various components of IHS 200.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. Processor(s) 205 may also be coupled to a power management unit 260 that may interface with the power system unit 135 of the chassis 100 in which an IHS, such as a compute sled, may be installed.

In certain embodiments, graphics processor 235 may be included within one or more video or graphics cards, or an embedded controller, installed as components of the IHS 200. Graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each FPGA card 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200.

IHS 200 may also support one or more storage controllers 230 that may be utilized to provide access to virtual storage configurations. For instance, storage controller 230 may provide support for RAID (Redundant Array of Independent Disks) configurations of storage devices 240*a*-*n*, such as storage drives provided by storage sleds 115*a*-*n* and JBOD 155 of FIG. 1. In some embodiments, storage controller 230 may be a Host Bus Adapter (HBA).

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. Certain functions provided by a BIOS may be implemented, in full or in part, by RAC 255.

As described, IHS 200 may be a storage sled 115*a*-*n*, such as shown with regard to FIG. 1. Accordingly, IHS 200 may be included within a large system of similarly configured IHSs that may be housed within the same chassis, rack and/or datacenter. In such scenarios, the remote access controller 255 may be configured to support automated deployment of the operating system of IHS 200 according to configuration settings specified by an administrator.

Remote access controller 255 may operate from a different power plane from processor(s) 205 and other components of IHS 200, thus allowing the remote access controller 255 to operate, and management tasks to proceed, while the processing cores of IHS 200 are powered off. In some embodiments, remote access controller 255 may perform various functions to verify the integrity of the IHS 200 and its hardware components prior to initialization of the IHS 200 (i.e., in a bare-metal state).

Remote access controller 255 may include service processor 255*a*, or a specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various devices 220, 225, 230 of an IHS via a sideband interface. In such embodiments, the messages in support of the monitoring and management function may be implemented using MCTP (Management Component Transport Protocol) that may be transmitted using I2C sideband bus connection 275a-c established with each of the respective managed devices 220, 225, 230. As illustrated, the managed hardware components of the IHS 200, such as FPGA cards 220, network controller 225 and storage controller 230, are coupled to the IHS processor(s) 205 via an in-line bus 215, such as a PCIe root complex, that is separate from the I2C sideband bus connection 275a-c.

In certain embodiments, the service processor 255a of remote access controller 255 may rely on an I2C co-processor 255b to implement sideband I2C communications between the remote access controller 255 and managed components 220, 225, 230 of the IHS. The I2C co-processor 255b may be a specialized co-processor or micro-controller that is configured to interface via a sideband I2C bus interface with the managed hardware components 220, 225, 230 of IHS. In some embodiments, the I2C co-processor 255b may be an integrated component of the service processor 255a, such as a peripheral system-on-chip feature that may be provided by the service processor 255a. Each I2C bus 275a-c is illustrated as single line; however, each I2C bus 275a-c may include a clock line and data line that couple the remote access controller 255 to I2C endpoints 220a, 225a, 230a, which may be referred to as field replaceable units (FRUs).

I2C co-processor 255b may interface with the individual managed devices 220, 225 and 230 via individual sideband I2C buses 275a-c selected through the operation of an I2C multiplexer 255d. Via switching operations by the I2C multiplexer 255d, a sideband bus connection 275a-c may be established by a direct coupling between the I2C co-processor 255b and an individual managed device 220, 225 or 230.

In providing sideband management capabilities, the I2C co-processor 255b may each interoperate with corresponding endpoint I2C controllers 220a, 225a, 230a that implement the I2C communications of the respective managed devices 220, 225, 230. The endpoint I2C controllers 220a, 225a, 230a may be implemented as a dedicated microcontroller for communicating sideband I2C messages with the remote access controller 255, or endpoint I2C controllers 220a, 225a, 230a may be integrated SoC functions of a processor of the respective managed device endpoints 220, 225, 230.

In various embodiments, IHSs 100 and 200 may not include each of the components shown in FIGS. 1 and 2. Additionally, or alternatively, IHSs 100 and 200 may include various additional components in addition to those that are shown in FIGS. 1 and 2. Furthermore, some components that are represented as separate components in FIGS. 1 and 2 may in certain embodiments instead be integrated with other components. For example, in certain embodiments, all or a portion of the functionality provided by the illustrated components may instead be provided by components integrated into one or more processor(s) as a system-on-chip (SoC) or the like.

Figure 3A:
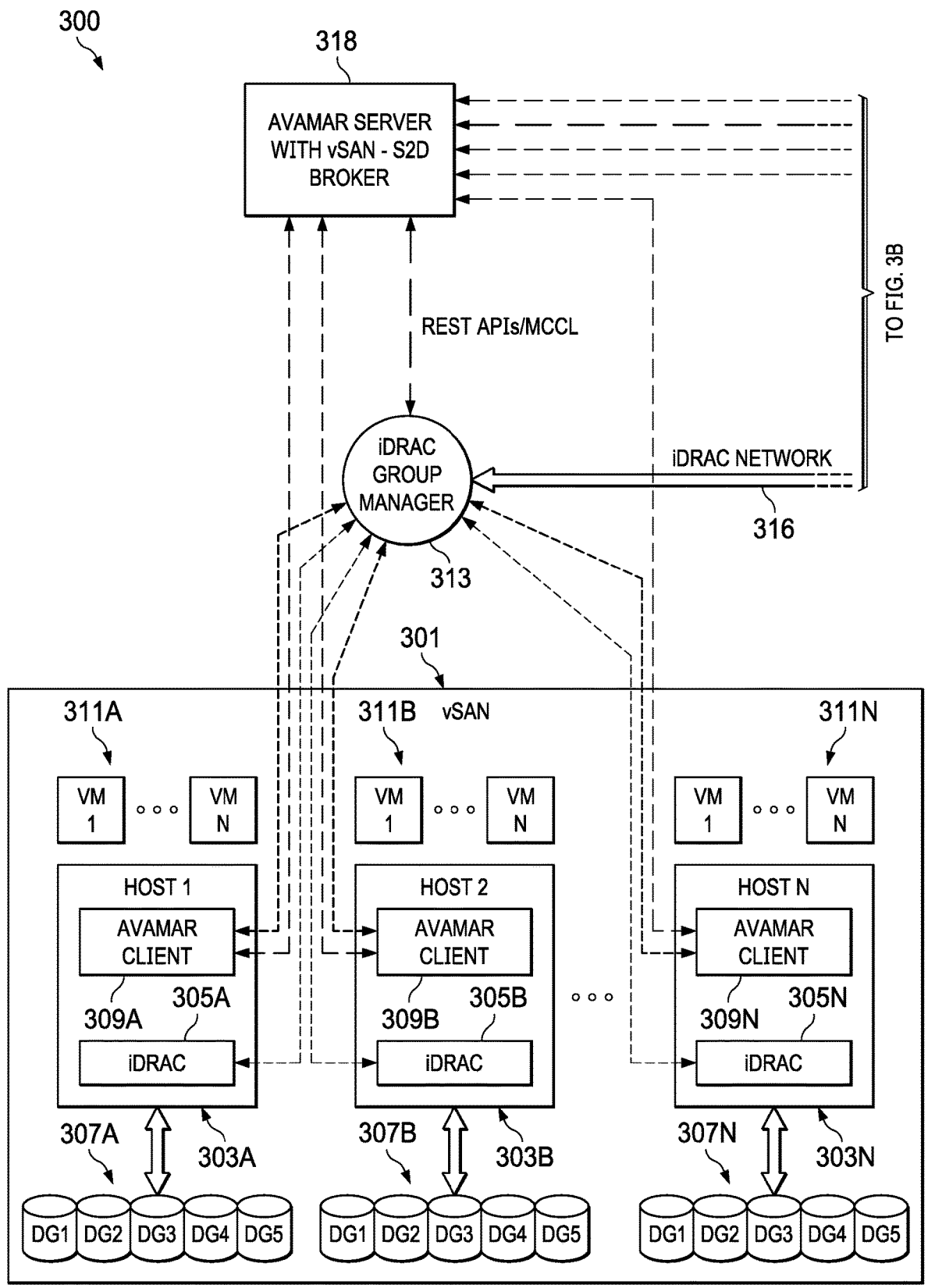
FIGS. 3A and 3B are block diagrams of an example of a hardware architecture configured to provide one-touch migration of virtual assets, according to some embodiments.
Figure 3B:
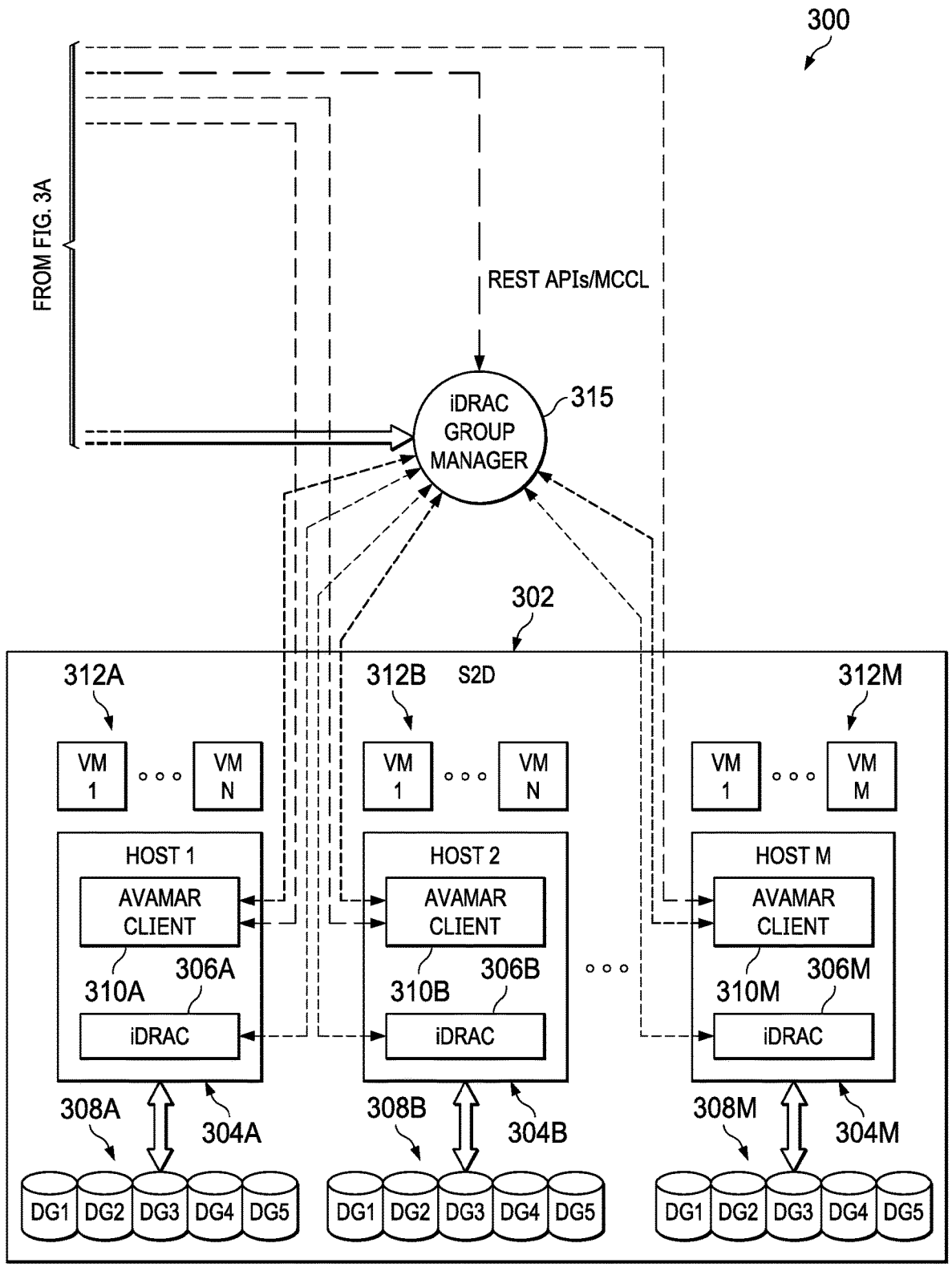

FIGS. 3A and 3B are block diagrams of an example of hardware architecture 300 configured to provide one-touch migration of virtual assets. In some embodiments, a plurality of client devices 200A-N may be implemented as different instances of IHS 200 in FIG. 2, and remote server 118 may be implemented as shown in FIG. 1. In this example, originating group or cluster 301 is a vSAN implementation and destination group or cluster 302 is an S2D implementation.

Originating group 301 includes a plurality of host IHSs 305A-N (e.g., IHS 200 and/or chassis 100) and destination group 302 includes another plurality of host IHSs 306A-M. Each of host IHSs 305A-N includes a plurality of storage devices 307A-N, RACs 305A-N (e.g., DELL's iDRAC), backup client 309A-N (e.g., DELL's AVAMAR), and VMs 311A-N. Similarly, each of host IHSs 306A-M includes a plurality of storage devices 308A-M, RACs 306A-M, backup clients 310A-M, and VMs 312A-M.

In type-2 or hosted hypervisor implementations, server IHS 100 executes an OS (e.g., Windows Server, Mac OS X Server, variants of Linux, etc.), which in turn enables execution of a hypervisor (e.g., Parallels, VMware workstation, etc.) configured to create and run VMs 311A-N and/or VMs 312A-M. In type-1 or bare-metal implementations, however, the OS may be absent and/or the hypervisor (e.g., HyperV, VMware ESXi, etc.) may run directly on hardware.

Any suitable one of RACs 305A-N may be designated as OGM 313, and any suitable one of RACS 306A-M may be designated as DGM 315 (e.g., based upon current or predicted processing loads, etc.). Moreover, OGM 313 may be in communication with DGM 315 over out-of-band RAC network 316. Backup server 318 may communicate with OGM 313 and DGM 315 over REST APIs and may operate as a vSAN to S2D broker to perform the actual migration of virtual assets from one technology cluster to the other once the migration is negotiated and validated between OGM 313 and DGM 315.

Figure 4:
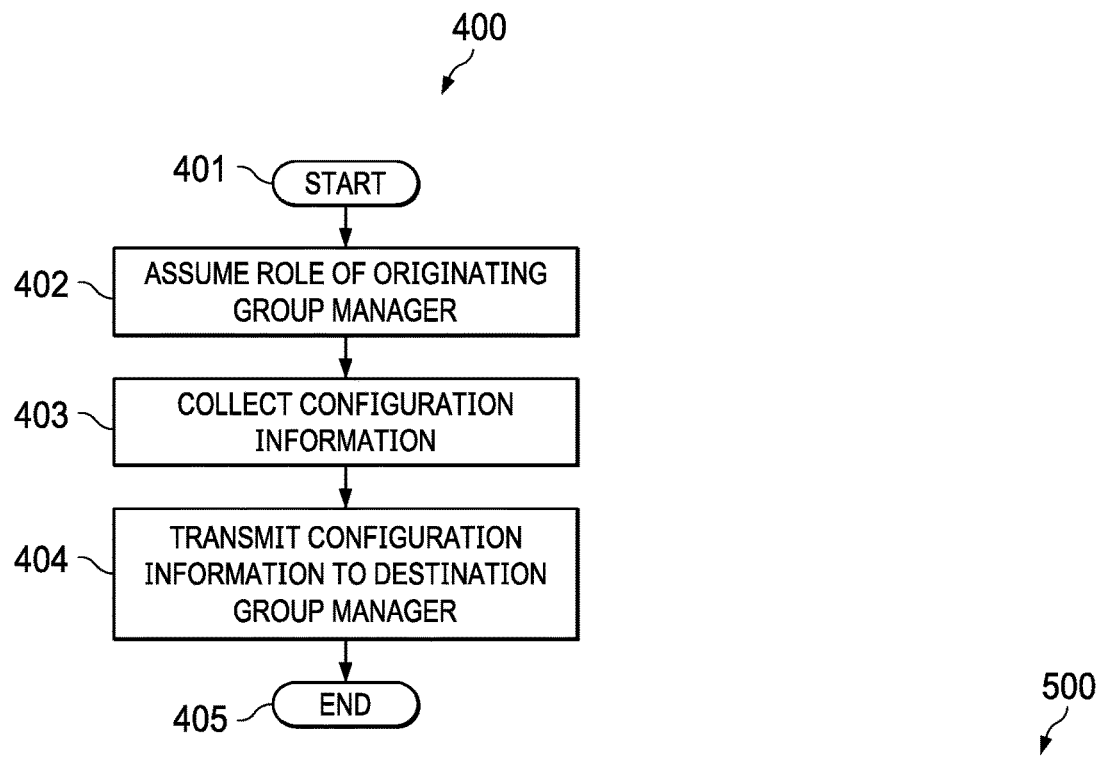
FIG. 4 is an example of a flowchart of a method for initiating a one-touch migration of virtual assets, according to some embodiments.

FIG. 4 is a block diagram of an example of a flowchart of method 400 configured to enable one-touch migration of virtual assets. In various embodiments, method 400 may be enabled through the execution of program instructions stored in system memory 210 of FIG. 2 of a host IHS including OGM 313. Particularly, method 400 starts at block 401, in some implementations with a single mouse click or command. At block 402, a given one of RACs 305A-N is designated as OGM 313. Then, at block 403, method 400 may collect configuration information from other hosts in the cluster.

For example, block 403 may collect hardware details by using inventory commands that inventory details from all participating hosts through their RACs that are using the backup solution. The collection may happen at site level; the entire data collected may be packaged as a zip file and transferred to DGM 315. Additionally, or alternatively, block 403 may collect configuration and/or OS deployment information using a Secure Copy Protocol (SCP) or the like.

Additionally, or alternatively, block 403 may collect information about virtual assets in cluster 301 (e.g., live or during runtime) using a VM manager or the like, including, but not limited to, cluster details, host details, VM details (priority, VPU, memory, disks), disks, pass through configuration (PCIe, Disk), vSwitch configuration, etc. Additionally, or alternatively, block 403 may collect backup configuration information. In some cases, the subsequent migration operation may be performed for all virtual assets at site level, taking advantage of the fact that individual clusters can be migrated in parallel. Yet additionally, or alternatively, block 403 may collect backup information by communicating with backup clients 309A-N on all participating hosts through REST APIs to configure/schedule backup data. Backup clients 309A-N may be configured/scheduled in such a way that data is backed up as per VM 311A-N in backup server 318.

Moreover, backup server 318 may include have a vSAN-S2D broker to map/translate data and configurations to match destination environment (vSAN/S2D). When migration is initiated, as shown in more detail below, OGM 313 sends the details of destination environment, participating hosts, backup client details etc. to backup server 318. Backup server 318 completes the data/configuration translation and sends it to backup clients 310A-M in the destination and configuration to DGM 315.

At block 404, method 400 may transmit the aforementioned configuration information and parameters to DGM 315. Then method 400 ends at block 405.

Figure 5:
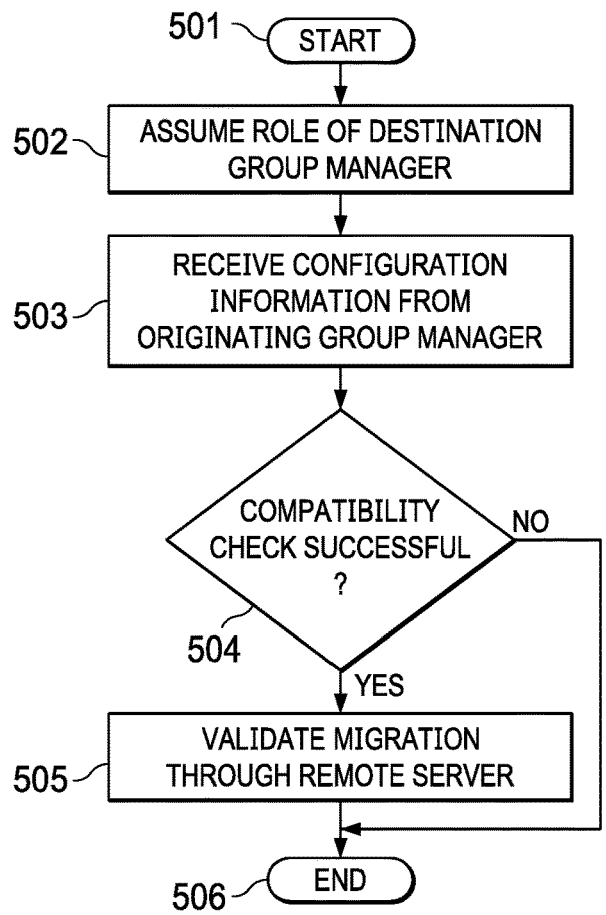
FIG. 5 is an example of a flowchart of a method for completing a one-touch migration of virtual assets, according to some embodiments.

FIG. 5 is an example of a flowchart of a method for completing a one-touch migration of virtual assets. In various embodiments, method 500 may be enabled through the execution of program instructions stored in system memory 210 of FIG. 2 of a host IHS including DGM 315. Specifically, method 500 begins at block 501. At block 502, one of RACs 306A-M in cluster 402 may assume the role of DGM 315.

At block 503, method 500 may receive the configuration information and parameters collected by OGM 313 via RAC network 316. Block 503 may unpackage the collected data and hand it off to the respective entities. For example, the SCP data may be given to all participating RACs that match the corresponding hardware inventory.

At block 504, method 500 may determine whether a compatibility check is successful. If so, control passes to block 505, otherwise method 500 ends. For example, block 504 may check if the properties can be transferred: (a) Do we need to normalize parameters? (b) Can properties be transferred to the target system? (c) Are there compatible properties? (d) Can transformation be applied if there are no compatible properties? (e.g., moving the VM format), etc. If yes, then block 505 may apply the properties to each virtual asset and move it to a corresponding target system. Moreover, in block 504, DGM 315 may communicate with backup clients 310A-M installed in the destination environment to store the received data appropriately according to the destination configurations.

Examples of checkpoint items specific to S2D/vSAN migration implementations that may be verified in block 504 are shown in Table I below:

TABLE I

| Migration Checkpoint Items | S2D | vSAN |
| --- | --- | --- |
| Infrastructure requirements | S2D Supporting OS, Hyper V | ESXi OS, vSphere, vCenter |
| Number of hosts | minimum 2 hosts | minimum 3 hosts |
| Supported disk types | HDD (SAS/SATA), SSD, NVMe | HDD (SAS/SATA), SSD, NVMe |
| Disk Preparation | unformatted (not partitioned) | unformatted (not partitioned) |
| Fault tolerance | 3-way mirroring, accelerated erasure coding | RAID1, 5, 6, erasure coding, witness nodes |
| Create cluster | cluster of participating hosts (Power shell commands) | cluster of participating hosts (Power shell commands) |
| Create volumes | Cluster Shared Volumes (Power shell commands) | create disk groups |
| Configuration | S2D optimized configuration | vSAN optimized configuration |
| Data storage | ReFS, 3-way mirroring, accelerated erasure coding | Deduplicated data |

Referring back to method 500, if the compatibility check of block 504 is successful, block 505 may validate the migration of the virtual assets through backup server 318, which may in turn initiate the actual migration process. Then method 500 ends at block 506.

As such, in various embodiments, systems and methods described herein may provide an efficient solution to migrate vSAN cluster to S2D (or vice versa) with a single mouse click using backup clients and RAC group managers by intelligently mapping data, hardware/firmware configurations and device settings to match a destination environment.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor;
a remote access controller (RAC) coupled to the processor; and
a memory coupled to the RAC, the memory having program instructions stored thereon that, upon execution, cause the RAC to:
assume a role of an originating group's manager, wherein the originating group comprises a first plurality of IHSs, and wherein each IHS of the first plurality of IHSs has one or more virtual assets of a first type;
collect configuration information related to other IHSs in the first plurality of IHSs; and
transmit the configuration information to a backup and recovery server configured to translate the configuration information and to transmit the translated configuration information to another RAC of another IHS, wherein the other RAC is designated as a destination group's manager, wherein the destination group comprises a second plurality of IHSs, and wherein the other RAC is configured to:
perform at least one compatibility check using the configuration information; and
in response to the compatibility check being successful, validate a migration of the one or more virtual assets from the first plurality of IHSs to the second plurality of IHSs and communicate the validation to the backup and recovery server, wherein the backup and recovery server uses the validation to initiate and perform the migration, and wherein the migrated virtual assets are of a second type different from the first type.

2. The IHS of claim 1, wherein the virtual assets comprise virtual machines (VMs), and wherein the first and second types are selected from the group consisting of: Virtual Hard Disk (VHD) format, and Open Virtualization Format (OVF) format.

3. The IHS of claim 1, wherein the virtual assets comprise virtual storage, and wherein the first and second types are selected from the group consisting of: virtual storage area network (vSAN), and storage spaces direct (S2D).

4. The IHS of claim 1, wherein the configuration information comprises at least one of: network switch information, storage information, and IHS hardware information.

5. The IHS of claim 1, wherein the backup and recovery server is configured to translate data from the first type to the second type.

6. The IHS of claim 1, wherein the transmission of the configuration information is performed via a RAC-to-RAC network.

7. The IHS of claim 1, wherein to perform the compatibly check, the other RAC is configured to normalize a priority of a virtual machine (VM).

8. The IHS of claim 1, wherein to perform the compatibly check, the other RAC is configured to translate a command from a first format of the first type to a second format of the second type.

* * * * *